(12) United States Patent
Nielsen et al.

(10) Patent No.: US 12,378,947 B2
(45) Date of Patent: Aug. 5, 2025

(54) METHOD FOR PLANNING REPOWERING OF A WIND ENERGY PLANT

(71) Applicant: VESTAS WIND SYSTEMS A/S, Aarhus N. (DK)

(72) Inventors: Anders Steen Nielsen, Aarhus C (DK); Søren Hove Sørensen, Hinnerup (DK)

(73) Assignee: VESTAS WIND SYSTEMS A/S, Aarhus (DK)

( * ) Notice: Subject to any disclaimer, the term of this patent is extended or adjusted under 35 U.S.C. 154(b) by 79 days.

(21) Appl. No.: 17/784,051

(22) PCT Filed: Dec. 1, 2020

(86) PCT No.: PCT/DK2020/050341
§ 371 (c)(1),
(2) Date: Jun. 9, 2022

(87) PCT Pub. No.: WO2021/115542
PCT Pub. Date: Jun. 17, 2021

(65) Prior Publication Data
US 2023/0025161 A1 Jan. 26, 2023

(30) Foreign Application Priority Data
Dec. 9, 2019 (DK) .................... 2019 70755

(51) Int. Cl.
*F03D 13/10* (2016.01)
(52) U.S. Cl.
CPC .......... *F03D 13/10* (2016.05); *F05B 2230/80* (2013.01); *F05B 2240/96* (2013.01); *F05B 2260/8211* (2013.01)
(58) Field of Classification Search
CPC .................. F03D 13/10; F05B 2230/80; F05B 2260/8211
See application file for complete search history.

(56) References Cited

U.S. PATENT DOCUMENTS

2008/0001409 A1* 1/2008 Schellings ............ F03D 7/0224
290/44
2010/0023266 A1* 1/2010 Stiesdal ................. F03D 17/00
700/286

FOREIGN PATENT DOCUMENTS

EP 2557311 A1 2/2013
EP 3165680 A1 5/2017
(Continued)

OTHER PUBLICATIONS

Danish Patent and Trademark Office, 1st Technical Examination including The Search Report and Search Opinion for Appliation PA 2019 70755 dated May 26, 2020.
(Continued)

*Primary Examiner* — Sean Gugger
(74) *Attorney, Agent, or Firm* — Patterson + Sheridan, LLP

(57) ABSTRACT

A method for planning repowering of a wind energy plant is disclosed. The wind energy plant is positioned at a site and comprises a plurality of original wind turbines arranged at distributed positions within the site. Historical data related to the original wind turbines is retrieved. The historical data is collected over a previous time period and during operation of the original wind turbines. Meteorological conditions at the site of the wind energy plant are estimated based on the retrieved historical data. The repowering of the wind energy plant is planned based on the estimated meteorological data, including planning replacement of the original wind turbines by replacement wind turbines to be positioned at the positions of the original wind turbines.

11 Claims, 2 Drawing Sheets

(56) References Cited

FOREIGN PATENT DOCUMENTS

| EP | 3380727 A1 | 10/2018 |
|----|------------|---------|
| EP | 3608538 A1 | 2/2020 |
| ES | 2537586 A1 | 6/2015 |
| WO | 2021115542 A1 | 6/2021 |

OTHER PUBLICATIONS

M. Bezbradica, H. Kerkvliet, I. M. Borbolla and P. Lehtimäki. Introducing multi-criteria decision analysis for wind farm repowering: A case study on Gotland. 2016 International Conference Multidisciplinary Engineering Design Optimization (MEDO), Belgrade, 2016, pp. 1-8, <doi: 10.1109/MEDO.2016.7746546>.

PCT, Notification of Transmittal of The International Search Report and The Written Opinion of The International Searching Authority, or The Declaration for Application PCT/DK2020/050341 dated Mar. 5, 2021.

Villena-Ruiz R et al: "A techno-economic analysis of a real wind farm repowering experience: The Malpica case", Energy Conversion and Management, Elsevier Science Publishers, Oxford, GB, vol. 172, Jul. 11, 2018 (Jul. 11, 2018), pp. 182-199.

Hou Peng et al: "Off shore wind farm repowering optimization", Applied Energy, vol. 208, Sep. 14, 2017 (Sep. 14, 2017), pp. 834-844.

European Patent Office, Communication pursuant to Article 94(3) EPC for European Patent Application No. 20821117.7, dated Jul. 19, 2024.

European Patent Office, Communication pursuant to Rule 114(2) EPC for European Patent Application No. 20821117.7, dated Aug. 1, 2024.

\* cited by examiner

METHOD FOR PLANNING REPOWERING OF A WIND ENERGY PLANT

FIELD OF THE INVENTION

The present invention relates to a method for planning repowering of a wind energy plant positioned at a site. More particularly, the method according to the invention allows planning repowering of the wind energy plant in a more precise manner compared to prior art methods.

BACKGROUND OF THE INVENTION

A wind turbine being in operation for a time period will eventually reach its design lifetime. At the end of the design lifetime of the wind turbine, the wind turbine may be decommissioned. Sometimes it may be desirable to replace the decommissioned wind turbine by a new wind turbine, in order to continue producing power at the site. The new wind turbine may be identical to the original wind turbine, or it may be of another type, e.g. with a higher or lower nominal power or different design parameters.

Replacing a decommissioned wind turbine with a new wind turbine, at the same position, is sometimes referred to as repowering. When a wind energy plant comprising a plurality of wind turbines is to be repowered, it is necessary to plan the repowering. To this end, it is desirable to obtain information regarding expected meteorological conditions at the site of the wind energy plant, in order to be able to estimate how the repowered wind energy plant may perform.

WO 2011/126224 A1 discloses a method for forecasting a wind energy production of a forecasting site. The method includes collecting data from a first site and a second site, which are geographically different from the forecasting site. The collected data is used for estimating the available power output at the forecasting site. The estimation is based on the data from the first site and the second site by projecting the data towards the future and/or the geographic position of the forecasting site.

U.S. Pat. No. 7,403,854 B1 discloses a method and an apparatus for providing information regarding electricity production for a test site based on estimated meteorological conditions for the test site. The method comprises identifying, for a test site, a corresponding reference site for which extended historical meteorological data is available. The test site has limited meteorological data available and is geographically remote from the reference site. The method uses the limited meteorological data from the test site and the extended historical meteorological data from the reference site to provide an estimate of future wind conditions, and hence the potential wind resource for the test site.

Thus, WO 2011/126224 A1 as well as U.S. Pat. No. 7,403,854 B1 discloses that data from other wind energy plants, located geographically remote from a wind energy plant where new wind turbines are planned, is used for deriving information regarding the site of the planned wind energy plant.

DESCRIPTION OF THE INVENTION

It is an object of embodiments of the invention to provide a method for planning repowering of a wind energy plant in a more precise manner compared to prior art methods.

According to a first aspect the invention provides a method for planning repowering of a wind energy plant positioned at a site, the wind energy plant comprising a plurality of original wind turbines arranged at distributed positions within the site, the method comprising the steps of:
retrieving historical data related to the original wind turbines, the historical data being collected over a previous time period and during operation of the original wind turbines,
estimating meteorological conditions at the site of the wind energy plant, based on the retrieved historical data, and
planning repowering of the wind energy plant, based on the estimated meteorological data, including planning replacement of the original wind turbines by replacement wind turbines to be positioned at the positions of the original wind turbines.

Thus, according to the first aspect, the invention provides a method for planning repowering of a wind energy plant. As described above, repowering is the process of replacing existing wind turbines within a wind energy plant with new wind turbines. In the present context the term 'wind energy plant' should be interpreted to mean a plurality of wind turbines arranged at distributed positions within a specified geographical area, i.e. a site, and which share some infrastructure, such as internal power grid, connection to an external power grid, substations, access roads, etc.

Thus, the original wind turbines are the wind turbines which are present in the wind energy plant at the time when it is decided to perform repowering.

In the method according to the invention, historical data related to the original wind turbines collected over a previous time period, and during operation of the original wind turbines, is initially retrieved.

When operating a wind turbine, a variety of information is required in order to allow the wind turbine to generate power according to a specified power curve, and in order to ensure that no part of the wind turbine is subjected to excessive loads. Furthermore, various parts of the wind turbine may be monitored in order to perform condition management and in order to detect faults, defects, wear, etc., and to be able to react before breakdown of individual components or the entire wind turbine occurs. To this end, a vast amount of data is normally collected during operation of a wind turbine. Such data could, e.g., include wind data, such as wind direction, wind speed, turbulence conditions, wind shear, etc., other ambient data, such as ambient temperature, humidity, precipitation, air density, pressure, etc., power production of the wind turbine, loads on various components, temperatures in various parts of the wind turbine, noise levels, vibrations, etc. The data may be obtained by means of sensors or other measurement devices, such as anemometers, mounted on the wind turbine itself. Alternatively or additionally, the data may be obtained by means of met masts located within the site or in the vicinity of the site, and/or from meteorological services, e.g. satellite based meteorological services.

Accordingly, the original wind turbines are operated in accordance with such data, during the previous time period. The operation of the original wind turbines may comprise controlling various control systems, such as pitch control system, generator control system, yaw control system, de-icing system, cooling system, etc., of the original wind turbines, based on the obtained data. Thus, the historical data comprises information necessary for operating the original wind turbines throughout the entire previous time period, as well as information regarding how the original wind turbines have operated.

Thus, the historical data related to the original wind turbines is collected during actual operation of the original wind turbines, and provides information regarding the conditions which the original wind turbines have been subjected to, and how the original wind turbines operated in response thereto.

The historical data may, during the previous time period, be collected using a data acquisition system, such as a SCADA system, and may be stored in a data storage. Thus, when the original wind turbines have operated for a long period of time, a large dataset, providing information regarding meteorological conditions prevailing at the site of the wind energy farm, as well as information related to the operation of the original wind turbines, is readily at hand, in the form of the historical data, which is retrieved at the time when it is decided to perform repowering.

The previous time period may, e.g., be the time period from the erection of the original wind turbines to the time when it is determined to plan repowering. Alternatively, the previous time period may be only a part of this time period, e.g. one or more time periods falling within this period of time. For instance, the previous time period could be the last 10 years out of a 25 year operating period for the original wind turbines, discrete 3 year time periods distributed across the entire operating period of the original wind turbines, or any other suitable time interval, during which the original wind turbines have been operating.

In any event, since the original wind turbines are approaching their design lifetime, and therefore have been operational for a long period of time, the previous time period, during which the historical data has been collected, is long. Hence, the historical data constitutes a large data set which comprises detailed information related to operation of the original wind turbines within the wind energy plant, and to the operating conditions which the original wind turbines have been subjected to within their operating time. Thus, the historical data provides detailed information related to the site. Furthermore, since the historical data has been collected over a long period of time, the variations in ambient conditions, such as wind direction, wind speed, gust conditions, turbulence conditions, wind shear, temperature, humidity, seasonal variations, etc., during the collection of data must be expected to be large. Accordingly, the variety of the historical data is high. Finally, the historical data relate to actual operation of actual wind turbines at the site where repowering is to be planned.

Next, meteorological conditions at the site of the wind energy plant are estimated, based on the retrieved historical data. The estimated meteorological conditions may be an expected forecast of the meteorological conditions at the site of the wind energy plant for a future time period. The estimated meteorological conditions may, e.g., comprise expected temperature, air pressure, humidity, precipitation, wind speed, wind direction, wind field, etc., at the site. Since operation of a wind turbine is strongly dependent on the meteorological conditions prevailing at the location of the wind turbine, it can be expected that information regarding the prevailing meteorological conditions can be retrieved from the historical data related to the original wind turbines.

Since the meteorological conditions at the site are estimated based on the retrieved historical data, which is related to the original wind turbines positioned at the same site, the resulting estimated meteorological conditions will also provide accurate information regarding the expected meteorological conditions at the site. Hence the estimated meteorological conditions will be more precise compared to a situation where the meteorological conditions at the site is estimated based on historical data retrieved from another geographical location.

Finally, repowering of the wind energy plant is planned, based on the estimated meteorological data. The planning of the repowering includes planning replacement of the original wind turbines by replacement wind turbines to be positioned at the positions of the original wind turbines. Accordingly, the resulting planned repowering specifies how original wind turbines of the wind energy plant are to be replaced by replacement turbines.

Thus, repowering of the wind energy plant is planned based on data which has been obtained at the actual site. The replacement wind turbines are the wind turbines that replace the original wind turbines when the planned repowering the wind energy plant is actually performed. Since the planning of repowering of the wind energy plant is based on the historical data for the same site, the planning can be performed on a more precise foundation than would be the case if the data had been obtained at another geographical location, because thereby the data which is applied as a foundation for the estimation of the meteorological conditions, and thereby for the planning of the repowering, relates directly to the actual site where the replacement wind turbines will eventually be positioned. In particular, the historical data is directly applicable in the estimation, without the need to process and/or transform the historical data to the conditions prevailing at the site of the wind energy plant.

The planning of repowering of the wind energy plant may comprise identifying one or more original wind turbines within the wind energy plant that may be replaced by one or more replacement wind turbines. Thus, all of the original wind turbines of the wind energy plant may be replaced by replacement wind turbines, or only some of the original wind turbines may be replaced. In the latter case, the original wind turbines which are not replaced may be decommissioned and removed from the wind energy plant, in which case the number of wind turbines in the wind energy plant is reduced by the repowering. However, if the replacement wind turbines have a higher nominal power than the turbines they are replacing, the total power output of the wind energy plant may be maintained or even increased. As an alternative, the original wind turbines which are not replaced may remain in the wind energy plant, possibly in an upgraded version. In any event, each of the replacement wind turbines is positioned at a position where an original wind turbine was positioned. As part of the planning of the repowering, it may be determined which of the original wind turbines should be replaced by a replacement wind turbine.

The planning of repowering of the wind energy plant may further comprise selecting a wind turbine type and/or one or more design parameters for at least one of the replacement wind turbines. Thus, based on the estimated meteorological conditions at the wind energy plant, a replacement wind turbine type and/or one or more design parameters of at least one replacement wind turbine may be selected, that is in accordance with the estimated meteorological conditions. This will be described in further detail below.

The method may further comprise the step of estimating expected performance of the replacement wind turbines based on the retrieved historical data. According to this embodiment, apart from estimating meteorological conditions, an expected performance of the replacement wind turbines, e.g. in terms of expected power production, expected loads, expected lifetime, etc., is estimated based on the historical data. Such expected performance is valuable information when planning a repowering, since it will provide an indication of how the wind energy plant may perform after the repowering has been conducted. This may also be used as a basis for deciding whether or not a repowering of the wind energy plant is feasible. Accordingly, the planning of the repowering of the wind energy plant may further be based on the estimated expected performance of the replacement wind turbines. Furthermore, since the historical data, which was collected at the actual site, is used as a basis for the estimation of the expected performance, an accurate estimate is obtained, similarly to what is described above.

The expected performance of the replacement wind turbines may be estimated directly from the historical data. As an alternative, the expected performance of the replacement wind turbines may be estimated based on the estimated meteorological conditions at the site of the wind energy plant, which was previously estimated from the historical data.

The step of estimating expected performance of the replacement wind turbines may comprise estimating an expected power production of the replacement wind turbines. According to this embodiment, power production of the replacement wind turbines is estimated for a future time period, thereby indicating the revenue which the owner of the wind energy plant may expect after the repowering has been conducted. The expected power production may, e.g., be the expected power production throughout the entire design life time of each replacement wind turbine, a yearly expected power production, expected power production during the first 5 years, or any other suitable estimate. The expected power production may be estimated based on the retrieved historical data or based on the estimated meteorological conditions, in the manner described above.

Alternatively or additionally, the step of estimating expected performance of the replacement wind turbines may comprise estimating expected loads on the replacement wind turbines. Thus, according to this embodiment, loads on the replacement wind turbines for a future time period are estimated. This could, e.g., be used for selecting a type of wind turbine, which is designed for the expected load level when planning the repowering of the wind energy plant, thereby avoiding breakdown or early fatigue of the replacement wind turbines.

The expected loads on the replacement wind turbines may be an estimation of loads that each of the replacement wind turbines may experience, e.g., throughout the entire design lifetime of the replacement wind turbines. The expected loads on the replacement wind turbines may be estimated based on the retrieved historical data or based on the estimated meteorological conditions, in the manner described above.

Alternatively or additionally, the expected performance of the replacement wind turbines may include expected current, voltage, frequency, efficiency, and/or any other suitable kind of information which indicates how the wind turbines are expected to perform.

The step of planning repowering of the wind energy plant may comprise, for at least one of the replacement wind turbines, selecting a wind turbine type and/or one or more design parameters. In the present context the term 'wind turbine type' should be interpreted to mean a specific wind turbine model or the like, manufactured by a specific manufacturer. A specific wind turbine type will typically specify a number of design parameters, such as nacelle design, nominal power, blade design, etc. However, within a given wind turbine type, it may be possible to select some design parameters, for instance hub height or tower design. Other design parameters, such as rotor diameter, choice of various electrical components, etc., may be selectable for some wind turbine types, but not for others.

As described above, the planning of the repowering of the wind energy plant is performed on the basis of the estimated meteorological conditions at the site of the wind energy plant. When selecting the type or types of wind turbines of the replacement wind turbines, it is important to select wind turbine types which are capable of withstanding the meteorological conditions prevailing at the site of the wind energy plant, e.g. in terms of wind speeds, turbulence conditions, wind shear, etc. Furthermore, a wind energy type which is expected to perform well under the prevailing meteorological conditions should be selected. For instance, at sites where high wind speeds are expected, wind turbine types which perform well at high wind speeds should be selected, and at sites where low wind speeds are expected, wind turbine types which perform well at low wind speeds should be selected.

Furthermore, the estimated meteorological conditions may vary across the site of the wind power plant, and therefore different types of wind turbines may be selected for different positions within the site, according to the estimated meteorological conditions at the individual positions. For instance, wind turbines with a small rotor diameter may be selected for positions arranged upstream along a dominating wind direction, and wind turbines with a larger rotor diameter may be selected for positions arranged downstream along this direction. Alternatively or additionally, wind turbines arranged along the boundary of the wind energy plant may be provided with a smaller rotor diameter than wind turbine arranged in the interior parts of the wind energy plant.

The method may further comprise the step of retrieving data related to wind turbines of one or more neighbouring wind energy plants located in the vicinity of the wind energy plant, and the step of estimating meteorological conditions may further be based on the data related to the wind turbines of the neighbouring wind energy plant(s). In the present context the term 'neighbouring wind energy plant' should be interpreted to mean a wind energy plant geographically close to the wind energy plant, and which may have, to a certain extent, some resemblance in terms of, e.g., the prevailing meteorological conditions.

Thus, according to this embodiment, the estimation of the meteorological conditions at the site of the wind energy plant is further based on data related to one or more sites which is/are positioned near the wind energy plant. Since the neighbouring site(s) is/are positioned near the wind energy plant which is to be repowered, it may be expected that the meteorological conditions prevailing at the neighbouring site(s) are similar to the meteorological conditions prevailing at the site of the wind energy plant to be repowered. Therefore it may be expected that data obtained at such a neighbouring site may be transferable to the site of the wind energy plant to be repowered. Accordingly, by including such data when estimating the meteorological conditions at the site of the wind energy plant to be repowered, a larger total amount of data is available, and an even more precise estimate can be obtained.

The historical data related to the original wind turbines may comprise sensor measurements performed by one or more sensors of the original wind turbines. According to this embodiment, information related to the original wind turbines is collected by the original wind turbines themselves, by means of one or more sensors positioned in the original wind turbines, during the operation of the original wind turbines, and in order to operate the original wind turbines properly. For instance, load sensors may be used in the original wind turbines to measure loads on, e.g., the tower, nacelle, rotor blades, etc., of the original wind turbines. Furthermore, temperature sensors may be used for measuring the temperature of, e.g., the generator, convertor, transformer, hydraulic fluid, internal temperature of the nacelle, etc. Alternatively or additionally, other sensors include, but are not limited to, pressure sensors, tachometers, current sensors, voltage sensors, etc. As described above, this information, collected during the previous time period, is stored and retrieved at a later point in time in order to plan the repowering of the wind energy plant. Thereby the repowering is based on the actual sensor data from the actual original wind turbines.

The step of estimating meteorological conditions may comprise deriving an expected wind field at the site. According to this embodiment, expected behaviour of the wind across the entire site is estimated. The wind field could, e.g., include information regarding expected wind directions and/or wind sectors, turbulence conditions, wake effects, etc. The power production of a wind turbine may, e.g., be dependent on the wind that the wind turbine experiences. Accordingly, it is possible to derive information regarding the wind field at the site of the wind energy farm from power production data from the individual original wind turbines.

The wind field may, e.g., be derived using a data model, e.g. specifying correlation between wind conditions and power production, and/or defining terrain of the site, e.g. including physical features of the site. Such physical features may comprise, but are not limited to, elevation, roughness, slope, hills, ridges, valleys, saddles, cliffs, vegetation, etc.

The historical data related to the original wind turbines may be retrieved from a data storage. As described above, the historical data may, during the previous time period, be collected by a data acquisition system, and stored in a data storage throughout the entire previous time period. According to this embodiment, when repowering is required, the historical data is retrieved from this data storage. The data storage may, e.g., be a database, a cloud storage, etc., in which large data sets may be stored.

The method may further comprise the step of replacing the original wind turbines with replacement wind turbines in accordance with the planned repowering. According to this embodiment, the actual repowering of the wind energy plant is performed by replacing at least some of the original wind turbines by replacement wind turbines, in the manner which is specified by the planned repowering. Since the repowering was planned in an accurate manner, as described above, the resulting repowered wind energy plant will most likely perform in the expected manner.

The step of planning repowering of the wind energy plant may comprise planning to reuse one or more parts of the original wind turbines in one or more of the replacement wind turbines. For instance, at least part of the foundation and/or at least part of the tower may be reused.

For instance, the entire foundation of one of the original wind turbines may be reused. In this case the foundation may be reused as it stands, i.e. the foundation of the replacement wind turbine is identical to the foundation of the original wind turbine. Alternatively, the foundation of the original wind turbine may form part of a new, enlarged, foundation of the replacement wind turbine. As another alternative, only part of the foundation of the original wind turbine may be reused, in which case part of the original foundation is removed, and the remaining part is reused, either forming the entire foundation of the replacement wind turbine, or forming part of the new foundation.

Similarly, the entire tower of one of the original wind turbines may be reused. In this case, the nacelle of the original wind turbine may simply be removed, and a new nacelle mounted on the original tower. As an alternative, one or more new tower sections may be added to the tower before the new nacelle is mounted thereon, thereby increasing the height of the resulting tower. As another alternative, only part of the tower of the original wind turbine may be reused, e.g. the lowermost tower section, i.e. the tower section which is attached to the foundation.

Reusing the part(s) of the original wind turbines reduces the need for using expensive equipment, such as cranes for erecting towers and/or concrete casting equipment. Furthermore, manufacturing costs and transportation costs may be reduced. Thereby, costs and time needed for repowering the wind energy plant is also reduced.

BRIEF DESCRIPTION OF DRAWINGS

The invention will now be described in further detail with reference to the accompanying drawings, in which.

DETAILED DESCRIPTION OF DRAWINGS

Figure 1:
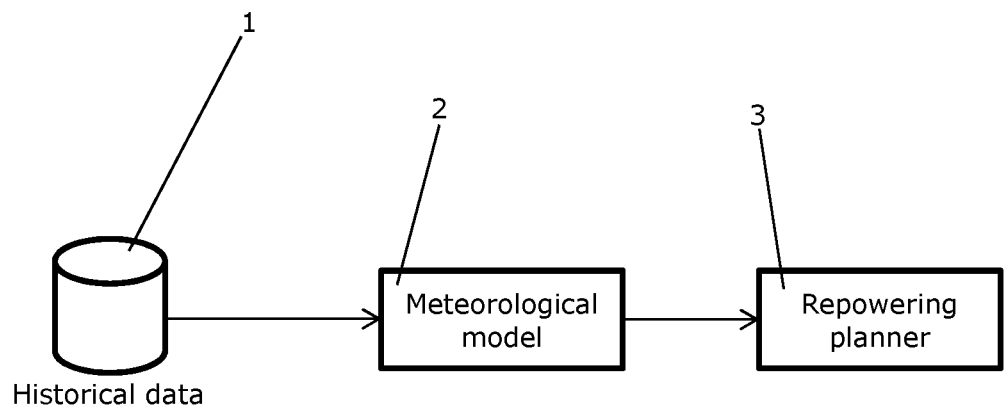
FIG. 1 is a block diagram illustrating a method according to an embodiment of the invention.

FIG. 1 is a block diagram illustrating a method according to an embodiment of the invention. Historical data related to original wind turbines of a wind energy plant to be repowered has been collected over a previous time period, and during operation of the original wind turbines. The historical data comprises information required for operating the original wind turbines during the previous time period, as well as information regarding how the original wind turbines have operated, and prevailing wind conditions. Thus, the historical data provides detailed information related to operation of the original wind turbines within the wind energy plant, and to the operating conditions which the original wind turbines have been subjected to within their operating time. The historical data may be collected using a data acquisition system, and stored in a data storage 1.

At the time when it is decided to perform repowering, the historical data is retrieved from the data storage 1 and provided to a meteorological model 2. Based on the retrieved historical data, the meteorological model 2 estimates meteorological conditions at the site of the wind energy plant. The meteorological model 2 may, e.g., be a model specifying correlation between power production of the original wind turbines and the prevailing meteorological conditions at the site of the wind energy plant. Alternatively or additionally, the model may specify terrain of the site, in which case the meteorological model 2 is a model of the physical features, such as elevation, roughness, slope, hills, ridges, valleys, saddles, cliffs, vegetation, etc., of the site. The estimated meteorological conditions at the site may, thus, be an expected forecast of the meteorological conditions at the site of the wind energy plant for a future time period. Thus, the estimated meteorological conditions provide detailed information regarding the expected behaviour of, e.g., the wind conditions for the site.

The estimated meteorological conditions for the site are provided from the meteorological model 2 to a repowering planner 3. The repowering planner 3 plans the replacement of the original wind turbines within the wind energy plant by replacement wind turbines to be positioned at positions of the original wind turbines. Thus, the repowering planner 3 derives a plan that specifies how original wind turbines of the wind energy plant are to be replaced by replacement turbines, and possibly which types of wind turbines to use. Since the estimated meteorological conditions are based on data for the same site, the planning is performed on a more precise foundation than would be the case if the data had been obtained at another geographical location.

Figure 2:
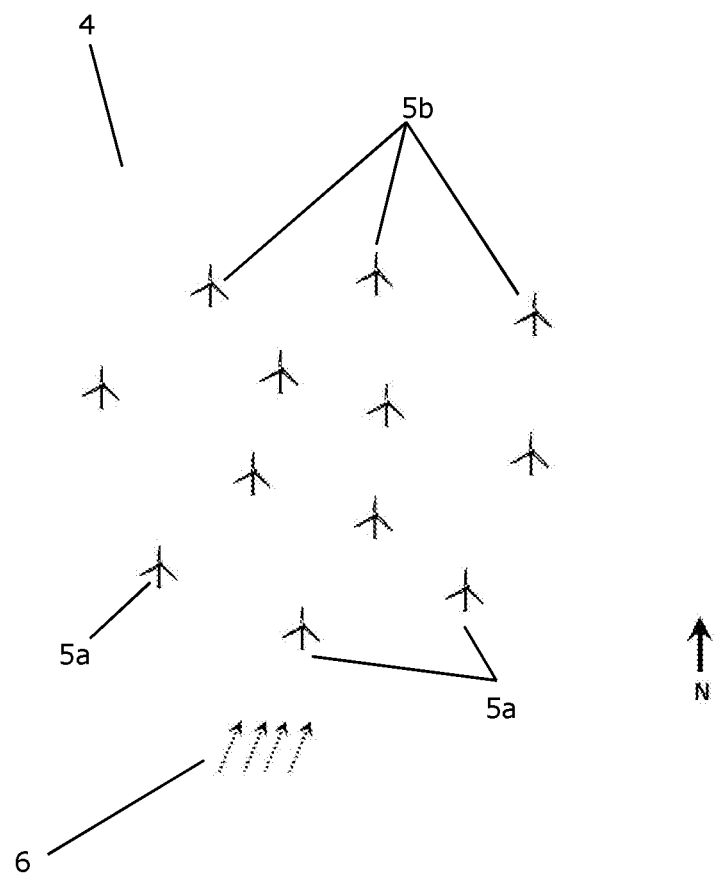
FIG. 2 illustrates a wind energy plant to be repowered in accordance with a method according to an embodiment of the invention.

FIG. 2 illustrates a wind energy plant 4 to be repowered in accordance with a method according to an embodiment of the invention. The wind energy plant 4 is positioned at a site and comprises a plurality of original wind turbines 5 arranged at distributed positions within the site. During operation of the original wind turbines 5, historical data related to the original wind turbines 5 is collected, in order to properly control the wind turbines 5.

Repowering of the wind energy plant 4 is planned by planning to replace the original wind turbines 5 with replacement wind turbines which are to be positioned at the positions of the original wind turbines 5. When planning the repowering of the wind energy plant 4, meteorological conditions at the site is estimated, based on the historical data, and the planning is performed based thereon, e.g. in the manner described above with reference to FIG. 1.

The estimated meteorological conditions may, e.g., reveal a dominating wind direction 6. Planning the repowering of the wind energy plant 4 may, thus, include selecting different wind turbine types for different positions within the wind energy plant 4. For instance, wind turbine 5a which are arranged upstream along the dominating wind direction 6, may be provided with a smaller rotor diameter than wind turbines 5b which are arranged downstream along the dominating wind direction 6. Thereby it is ensured that the upstream wind turbines 5a do not extract so much energy from the wind that the downstream wind turbines 5b are unable to operate properly.

The invention claimed is:

1. A method for planning repowering of a wind energy plant positioned at a site, the wind energy plant comprising a plurality of original wind turbines arranged at distributed positions within the site, the method comprising:
    retrieving historical data for the original wind turbines, the historical data being collected over a previous time period and during operation of the original wind turbines, wherein the historical data comprises:
        first data (i) collected by load sensors in the original wind turbines during the previous time period and (ii) indicating loads experienced by the original wind turbines during operation of the original wind turbines during the previous time period;
        second data (i) collected by temperature sensors in the original wind turbines during the previous time period and (ii) indicating temperatures of components of the original wind turbines during operation of the original wind turbines during the previous time period; and
        third data (i) collected by sensors at the site and (ii) indicating wind conditions at the site during operation of the original wind turbines during the previous time period;
    estimating, based on the first data, expected loads on replacement wind turbines for the original wind turbines arranged at the distributed positions within the site;
    estimating meteorological conditions at each of the distributed positions within the site of the wind energy plant using the first data, the second data, and the third data rather than data indicating wind conditions at another site different from the site; and
    planning repowering of the wind energy plant, based on the estimated meteorological conditions and the estimated expected loads on the replacement wind turbines, including planning replacement of the original wind turbines by the replacement wind turbines, wherein planning replacement of the original wind turbines by the replacement wind turbines comprises:
        selecting, for a first original wind turbine of the original wind turbines that is located at a first position of the distributed positions, a first type of replacement wind turbine included in the replacement wind turbines based on the first position being downstream along a dominant wind direction indicated by the estimated meteorological conditions; and
        selecting, for a second original wind turbine of the original wind turbines that is located at a second position of the distributed positions, a second type of replacement wind turbine included in the replacement wind turbines based on the second position being upstream along the dominant wind direction, wherein the second type of replacement wind turbine is configured to extract less than a threshold amount of energy that is based on operation of the first type of replacement wind turbine.

2. The method of claim 1, further comprising estimating expected performance of the replacement wind turbines based on the retrieved historical data.

3. The method of claim 2, wherein estimating the expected performance of the replacement wind turbines comprises estimating an expected power production of the replacement wind turbines.

4. The method of claim 1, further comprising retrieving data related to wind turbines of one or more neighbouring wind energy plants located in a vicinity of the wind energy plant, and wherein estimating meteorological conditions is further based on the data related to the wind turbines of the neighbouring wind energy plants.

5. The method of claim 1, wherein estimating meteorological conditions comprises deriving an expected wind field at the site.

6. The method of claim 1, wherein the historical data related to the original wind turbines is retrieved from a data storage.

7. The method of claim 1, further comprising replacing the original wind turbines with replacement wind turbines in accordance with the planned repowering.

8. The method of claim 1, wherein planning the repowering of the wind energy plant comprises planning to reuse one or more parts of the original wind turbines in one or more of the replacement wind turbines.

9. The method of claim 1, wherein:
    the first position corresponds to an interior location of the wind energy plant; and
    the second position corresponds to a boundary location of the wind energy plant.

10. The method of claim 1, wherein:
    the first type of replacement wind turbine includes a rotor having a first diameter; and
    the second type of replacement wind turbine includes a rotor having a second diameter that is different than the first diameter.

11. The method of claim 10, wherein the second diameter is smaller than the first diameter.

\* \* \* \* \*